US012716429B2

(12) United States Patent
Rao et al.

(10) Patent No.: US 12,716,429 B2
(45) Date of Patent: Aug. 25, 2026

(54) ACTUATOR ASSEMBLY FOR A HEAVY CONSTRUCTION MACHINE

(71) Applicant: WIPRO ENTERPRISES PVT. LTD., Bengaluru (IN)

(72) Inventors: Vanka Ganeswara Rao, Bengaluru (IN); S Rahul, Bengaluru (IN)

(73) Assignee: WIPRO ENTERPRISES PVT. LTD., Bengaluru (IN)

( * ) Notice: Subject to any disclaimer, the term of this patent is extended or adjusted under 35 U.S.C. 154(b) by 0 days.

(21) Appl. No.: 19/213,968

(22) Filed: May 20, 2025

(65) Prior Publication Data

US 2025/0361889 A1 Nov. 27, 2025

(30) Foreign Application Priority Data

May 21, 2024 (IN) ............................ 202441039677

(51) Int. Cl.
*F15B 15/14* (2006.01)
*F15B 11/036* (2006.01)
*E02F 9/22* (2006.01)

(52) U.S. Cl.
CPC ........ *F15B 15/1438* (2013.01); *F15B 11/036* (2013.01); *F15B 15/1428* (2013.01); *F15B 15/1433* (2013.01); *F15B 15/1447* (2013.01); *E02F 9/2271* (2013.01);
(Continued)

(58) Field of Classification Search
CPC .............. F15B 15/1438; F15B 15/1447; F15B 2211/7107; F15B 2211/76; F15B 15/1428; F15B 2211/20592; F15B 2211/7055; F15B 11/036; E02F 9/2271
See application file for complete search history.

(56) References Cited

U.S. PATENT DOCUMENTS 2,891,514 A * 6/1959 Moeller ................ F15B 11/076 92/9
3,353,429 A * 11/1967 Duncan ................ F15B 11/044 91/533
(Continued)

FOREIGN PATENT DOCUMENTS

EP 4491809 A1 * 1/2025 .......... F15B 11/0426

*Primary Examiner* — Dustin T Nguyen
(74) *Attorney, Agent, or Firm* — The Inventor's Friend Patent Law Firm, P.L.L.C.; Nathaniel A. Wickliffe

(57) ABSTRACT

The disclosure herein generally relate to heavy construction machines and more particularly to an actuator assembly for the heavy construction machine such as but not limited to an excavator. The actuator assembly (1000) includes a main cylinder assembly (1100) and a plunger cylinder assembly (1200) disposed parallel to the main cylinder assembly (1100). The main cylinder assembly (1100) is a double acting cylinder assembly, and the plunger cylinder assembly (1200) is a single acting cylinder assembly. The actuator assembly (1000) includes three chambers (1102A, 1102B, 1202A) adapted to be selectively coupled with at least one of a high pressure (HP) hydraulic line, a medium pressure (MP) hydraulic line and a low pressure hydraulic line (LP) based on load requirement of actuator assembly (1000). The actuator assembly (1000) is configured to reduce throttling loss at control valves thereby reducing an overall power consumption of heavy construction machine.

9 Claims, 4 Drawing Sheets

(52) U.S. Cl.
CPC ............... *F15B 2211/20592* (2013.01); *F15B 2211/7055* (2013.01); *F15B 2211/7107* (2013.01); *F15B 2211/76* (2013.01)

(56) References Cited

U.S. PATENT DOCUMENTS

| | | | | |
|---|---|---|---|---|
| 3,530,767 | A * | 9/1970 | Shook | F15B 11/16 91/519 |
| 3,610,103 | A * | 10/1971 | Adams | F15B 11/16 91/452 |
| 9,021,798 | B2 * | 5/2015 | Sipola | F15B 21/14 60/428 |
| 9,494,168 | B2 * | 11/2016 | Lind | F15B 11/036 |
| 11,060,539 | B2 * | 7/2021 | Li | F03C 1/26 |
| 2012/0272708 | A1 * | 11/2012 | Scheidl | B30B 15/161 72/453.07 |

* cited by examiner

ACTUATOR ASSEMBLY FOR A HEAVY CONSTRUCTION MACHINE

The following specification particularly describes the invention and the manner in which it is to be performed.

TECHNICAL FIELD

The embodiments herein generally relate to heavy construction machines and more particularly to an actuator assembly for the heavy construction machine such as but not limited to an excavator.

BACKGROUND

Generally, an excavator is a heavy construction machine which is used in construction related activities and earth moving activities. For example, the excavators are used mainly for digging purposes as well as various lifting and carrying tasks in various applications. Further, special tools such as hydraulic breakers, cutters, shears, grapples, couplers, etc. can be attached at the end of the various boom and arm configurations thereby allowing the excavators to perform a wider range of activities. Typically, the excavator includes a boom, arm, bucket and cab on a rotating superstructure atop an undercarriage with tracks or wheels. Each of the arm, boom and the bucket of the excavator utilizes a hydraulic actuator. The hydraulic cylinder generates a force to move objects based on the hydraulic pressure within the cylinder and the effective area of a piston moving within the cylinder resulting in a load force. In typical cylinders, two chambers are used, each with a respective effective area, such an arrangement creates a force in each direction. The net force resultant of pressurized fluid acting in both areas of the cylinders is typically referred to as a cylinder load. Conventional applications usually act on the flowrate in/out one chamber while the remainder chamber is kept at a pressure as low as possible in order to reduce system losses. Different hydraulic control architectures were developed over the years, especially as the number of hydraulic actuators per machine increased. Commonly, these architectures have the use of shared hydraulic power supply, e.g., a hydrostatic pump, and control valves dedicated to each actuator. The associated challenges with these architectures is that the first challenge is the controllability of multiple actuators with a single and shared source of hydraulic power, and the second challenge is the energy efficiency. While different approaches have been successful with regards to the first challenge, most circuits currently available still suffer from low efficiency when powering more than one actuator at a time mostly due to throttling losses in control valves. When more than one hydraulic actuator shares the same hydraulic supply, the supplied pressure must be slightly higher than the maximum pressure requirements in the system. Therefore, any other hydraulic actuator requiring lower pressure to achieve the desired load will need throttle control to decrease the supply pressure to the desired level, which leads to power losses which may vary from 35% to 72% of total energy consumption.

Therefore, there exists a need for an actuator assembly, which obviates the aforementioned drawbacks.

OBJECTS

The principal object of embodiments herein is to provide an actuator assembly with three chambers for heavy construction machine (excavator) to reduce throttling loss at control valves.

Another object of embodiments herein is to reduce energy power consumption of the heavy construction machine (excavator).

These and other objects of embodiments herein will be better appreciated and understood when considered in conjunction with following description and accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments are illustrated in the accompanying drawings, throughout which like reference letters indicate corresponding parts in various figures. The embodiments herein will be better understood from the following description with reference to the drawings, in which.

DETAILED DESCRIPTION

Figure 1A:
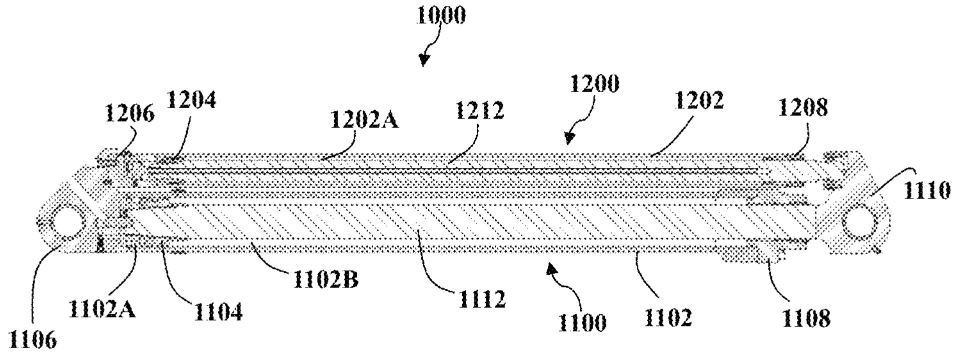
FIG. 1A depicts a sectional view of an actuator assembly for a heavy constructional machine in which the actuator assembly is in a retracted position, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve an actuator assembly with three chambers for a heavy construction machine such as but not limited to an excavator. Referring now to the drawings FIGS. 1 through 4, where similar reference characters denote corresponding features consistently throughout the figures, there are shown embodiments.

FIG. 1A depicts a sectional view of an actuator assembly (1000) for a heavy constructional machine in which the actuator assembly (1000) is in a retracted position, according to embodiments as disclosed herein. In an embodiment, the actuator assembly (1000) includes a main cylinder assembly (1100) and a plunger cylinder assembly (1200) disposed parallel to the main cylinder assembly (1100). The main cylinder assembly (1100) is a double acting cylinder assembly, and the plunger cylinder assembly (1200) is a single acting cylinder assembly. For the purpose of this description and ease of understanding, the actuator assembly (1000) is explained herein with below reference to be provided in the heavy construction machine such as but not limited to an excavator. However, it is also within the scope of the invention to use/practice the actuator assembly (1000) in or any other vehicles or any other applications without otherwise deterring the intended function of the actuator assembly (1000) as can be deduced from the description and corresponding drawings.

Each of boom, arm and bucket of the heavy construction machine utilizes the actuator assembly (1000). To minimize the pressure difference between the supply system and the pressure requirements of each one of the actuators (1000) sharing the same supply, common pressure rail (CPR) system is introduced. To achieve such a condition, it is possible to (1) increase the number of supply pressure rails such that more than one supply pressure is available, and (2) increase the number of cylinder chambers such that different combinations of connections between chambers and supply rails can be used to minimize the throttling requirement, therefore reducing system losses. With more options to combine different chamber areas and pressures, it is possible to achieve the same load (effective cylinder force) with a lower difference between supply pressure and chamber pressure, therefore decreasing throttling losses. As a result, the higher the number of available combinations (cylinder modes), the actuator assembly (1000) becomes more efficient. The relationship between pressure rails and the number of chambers in achieving discretized number of possible connections between pressure rails and cylinder chambers (modes) for different applications is governed by the equation as follows.

$$n_{FL} = n_{PR}^{n_{CC}}$$

where $n_{FL}$ is the number of available force modes, $n_{PR}$ is the number of pressure rails and $n_{CC}$ is the number of cylinder chambers. Therefore, it is possible to increase the number of static force modes available by adding extra chambers to the actuator. In the embodiment, the number of cylinder chambers ($n_{CC}$) is three and the number of pressure rails ($n_{PR}$) is three. Therefore, the actuator assembly (1000) is configured to have 27 force modes.

Figure 2A:
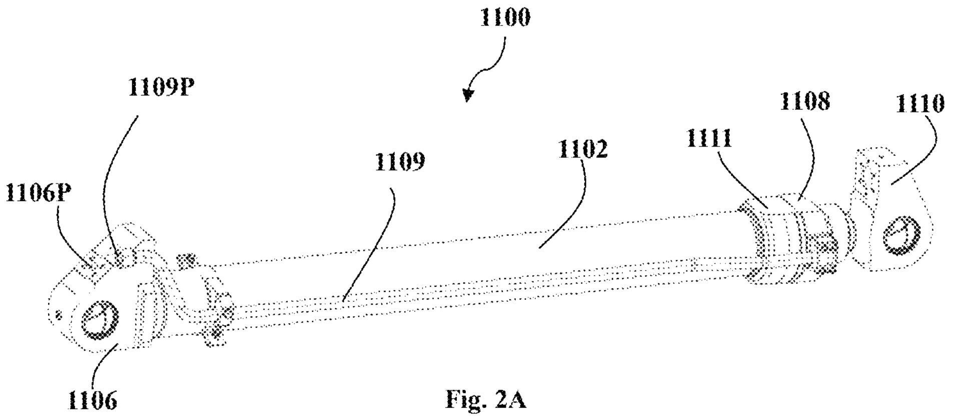
FIG. 2A depicts a perspective view of a main cylinder assembly of the actuator assembly, according to embodiments as disclosed herein.
Figure 2B:
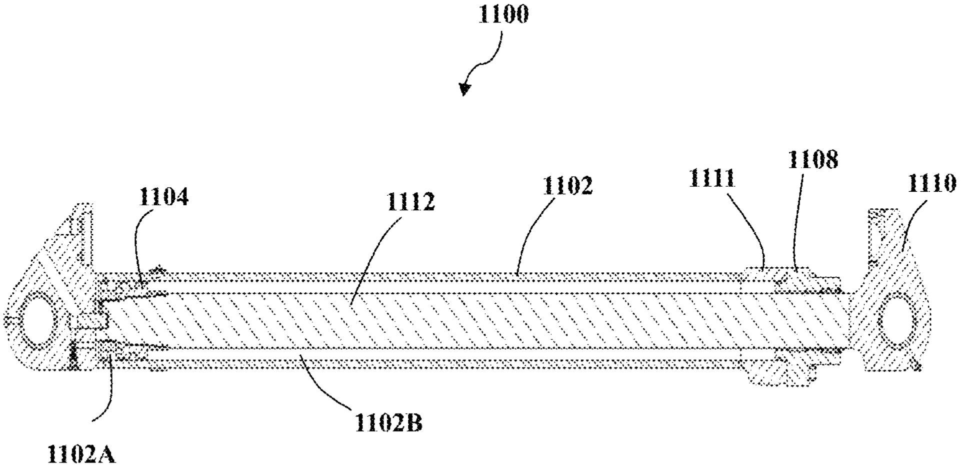
FIG. 2B depicts a sectional view of the main cylinder assembly, according to embodiments as disclosed herein.

FIG. 2A and FIG. 2B illustrates the main cylinder assembly (1100) of the actuator assembly (1000), according to embodiments as disclosed herein. In an embodiment, the main cylinder assembly (1100) includes a main cylinder (1102), a main cylinder piston (1104), a main cylinder cap end cover (1106), a main cylinder head end cover (1108), a main cylinder rod eye (1110) and a main cylinder piston rod (1112). The main cylinder (1102) defines a first chamber (1102A) and a second chamber (1102B) (as shown in FIG. 1A) in which the main cylinder piston (1104) separates the first chamber (1102A) from the second chamber (1102B). The main cylinder piston (1104) is slidably disposed within the main cylinder (1102). The main cylinder cap end cover (1106) is connected to one end of the main cylinder (1102). For example, the main cylinder cap end cover (1106) is welded to one end of the main cylinder (1102). The main cylinder cap end cover (1106) defines a main cylinder cap end side port (1106P) adapted to facilitate entry or exit of hydraulic fluid with the first chamber (1102A) of the main cylinder (1102). The main cylinder assembly (1100) includes a hydraulic fluid delivery tube (1109), wherein one end of the tube (1109) is connected to the main cylinder head end cover (1108) and another end of the tube (1109) defines a main cylinder head end side port (1109P) adapted to facilitate entry or exit of hydraulic fluid with respect to the second chamber (1102B) of the main cylinder (1102). The main cylinder head end cover (1108) is coupled to another end of the main cylinder (1102). For example, the main cylinder head end cover (1108) is removably connected to a flange (1111) which is fixedly connected (welded) to another end of the main cylinder (1102). One end of the main cylinder piston rod (1112) is connected to the main cylinder piston (1104) and another end of the main cylinder piston rod (1112) is connected to the main cylinder rod eye (1110).

Figure 3A:
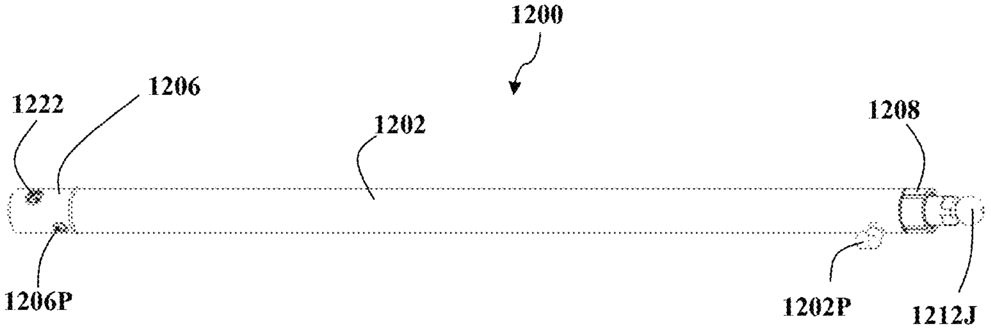
FIG. 3A depicts a perspective view of a plunger cylinder assembly of the actuator assembly, according to embodiments as disclosed herein.
Figure 3B:
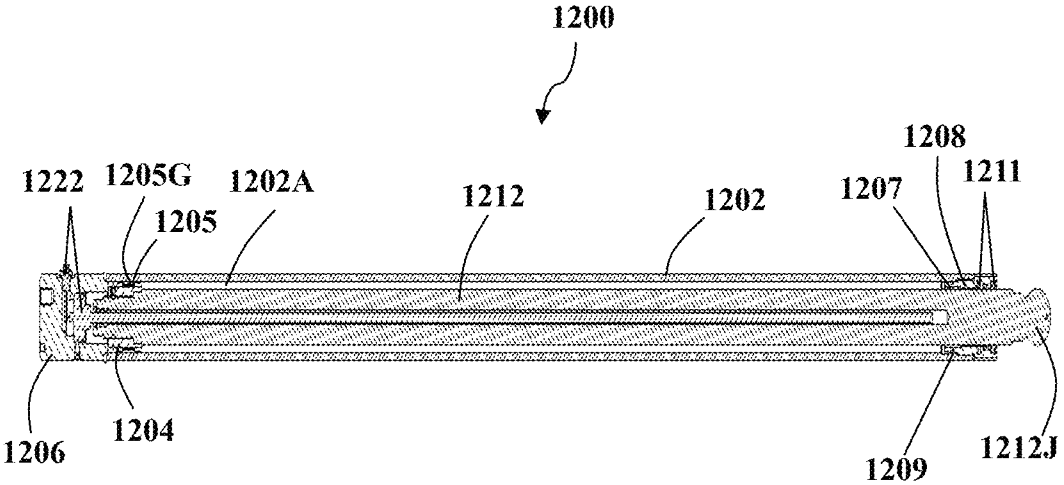
FIG. 3B depicts a sectional view of the plunger cylinder assembly, according to embodiments as disclosed herein.

FIG. 3A and FIG. 3B illustrates the plunger cylinder assembly (1200) of the actuator assembly (1000), according to embodiments as disclosed herein. In an embodiment, the plunger cylinder assembly (1200) includes a plunger cylinder (1202), a plunger cylinder piston (1204), a plunger cylinder piston bearing (1205), a plunger cylinder cap end cover (1206), a plunger cylinder bimetallic bush (1207), a plunger cylinder head end cover (1208), at least one first sealing element (1209), a plurality of second sealing elements (1211), a plunger cylinder piston rod (1212), and a linear position sensor (1222).

The plunger cylinder (1202) defines a third chamber (1202A) (as shown in FIG. 1A) therein. The plunger cylinder (1202) is provided with an aeration port (1202P) (as shown in FIG. 3A) adapted to facilitate removal of air entrapped inside the plunger cylinder (1202). The removal of air from the plunger cylinder (1202) is performed prior to installation of the actuator assembly (1000) to the heavy construction machine. The plunger cylinder piston (1204) is slidably disposed within the plunger cylinder (1202). The plunger cylinder piston bearing (1205) is adapted to be mounted onto the plunger cylinder piston (1204), wherein the plunger cylinder piston (1204) is not provided with piston seal and a gap (1205G) is defined between the plunger cylinder piston bearing (1205) and the plunger cylinder piston (1204) to allow hydraulic fluid flow from one side of the plunger cylinder piston (1204) to another side of the plunger cylinder piston (1204). The third chamber (1202A) of the plunger cylinder (1202) includes area from both sides of the plunger cylinder piston (1204). The plunger cylinder cap end cover (1206) is connected to one end of the plunger cylinder (1202). The plunger cylinder cap end cover (1206) defines a plunger cylinder cap end side port (1206P) adapted to facilitate entry or exit of hydraulic fluid with respect to the third chamber (1202A) of the plunger cylinder (1202). The plunger cylinder bimetallic bush (1207) is adapted to be received by a bush receiving groove (not shown) defined in plunger cylinder head end cover (1208) at is inner side. The plunger cylinder bimetallic bush (1207) is adapted to guide the plunger cylinder piston rod (1212) during extension and retraction of the plunger cylinder piston rod (1212). The plunger cylinder piston bearing (1205) and the plunger cylinder bimetallic bush (1207) are adapted to improve side load carrying capacity of the plunger cylinder assembly (1200). The plunger cylinder head end cover (1208) is removably connected to another end of the plunger cylinder (1202). The first sealing element (1209) is adapted to be received by a first seal receiving groove (not shown) defined on the plunger cylinder head end cover (1208) at its outer side and is engaged with the plunger cylinder (1202). Each of the second sealing element (1211) is adapted to be received by a second seal receiving groove (not shown) defined in the plunger cylinder head end cover (1208) at its inner side and is engaged with the plunger cylinder piston rod (1212). One end of the plunger cylinder piston rod (1212) is connected to the plunger cylinder piston (1204) and another end of the plunger cylinder piston rod (1212) defines a ball-socket joint (1212J) which is connected to the main cylinder rod eye (1110) of the main cylinder assembly (1100). The ball-socket joint (1212J) is provided to improve the flexibility and degree of freedom for the plunger cylinder piston rod (1212). In an embodiment, the actuator assembly (1000) includes a locating pin (1216) adapted to connect the plunger cylinder cap end cover (1206) with the main cylinder cap end cover (1106) thereby positioning (aligning) the plunger cylinder assembly (1200) with respect to the main cylinder cap end cover (1106). In an embodiment, the actuator assembly (1000) includes at least one first locking element (1210) adapted to lock the plunger cylinder cap end cover (1206) to the main cylinder cap end cover (1106) thereby locking the plunger cylinder assembly (1200) with the main cylinder cap end cover (1106). For the purpose of this description and ease of understanding, the first locking element (1210) is considered to be a bolt. In an embodiment, the actuator assembly (1000) includes a first retention member (1214) adapted to retain the first locking element (1210) against the main cylinder cap end cover (1106). For the purpose of this description and ease of understanding, the first retention member (1214) is at least a snap ring. In an embodiment, the actuator assembly (1000) includes a second retention member (1218) adapted to retain the ball-socket joint (1212J) against the main cylinder rod eye (1110). Further, in an embodiment, the actuator assembly (1000) includes a plurality of second locking elements (1220) adapted to lock the second retention member (1218) against the main cylinder rod eye (1110). For the purpose of this description and ease of understanding, each of the second locking element (1220) is at least a bolt. The linear position sensor (1222) is adapted to detect a position/stroke of the actuator assembly (1000) and sends an output signal to a controller unit of the heavy construction machine. The linear position sensor (1222) is configured to utilize magneto strictive property to determine the position of the plunger cylinder piston rod (1212) and the main cylinder piston rod (1112) and sends velocity feedback to the controller unit (control system) which in turn estimates the required flow rate from pressure rails.

Figure 1B:
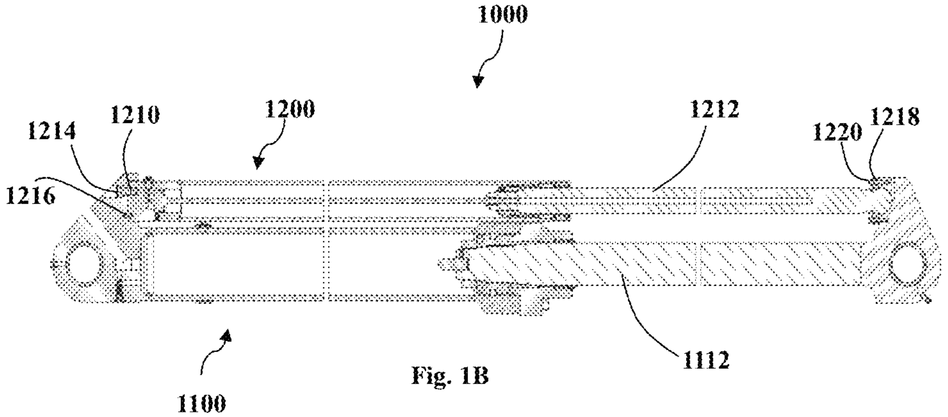
FIG. 1B depicts a sectional view of the actuator assembly in an extended position, according to embodiments as disclosed herein.
Figure 4:
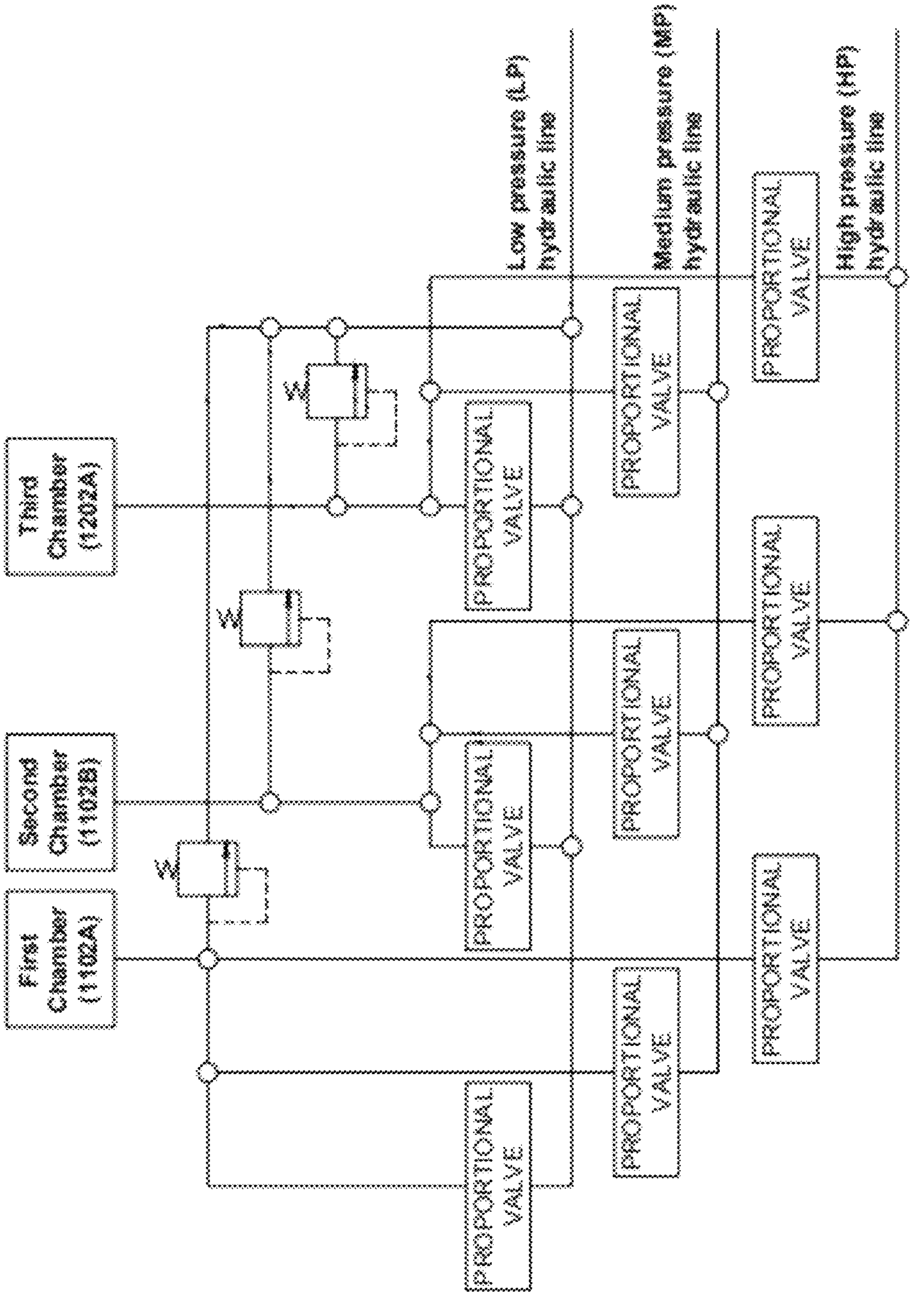
FIG. 4 depicts a circuit diagram of the actuator assembly coupled to a high pressure hydraulic line, a medium pressure hydraulic line and a low pressure hydraulic line, according to embodiments as disclosed herein.

FIG. 4 depicts a circuit diagram of the actuator assembly (1000) coupled to a high pressure (HP) hydraulic line, a medium pressure (MP) hydraulic line and a low pressure (LP) hydraulic line, according to embodiments as disclosed herein. Each of the first, second and third chambers (1102A, 1102B, 1202A) are selectively provided in fluid communication with one of the high pressure (HP) hydraulic line, the medium pressure (MP) hydraulic line and the low pressure (LP) hydraulic line based on load requirement of the actuator assembly (1000). If the sum of the force generated in the first chamber (1102A) of the main cylinder (1102) and the third chamber (1202A) of the plunger cylinder (1202) exceeds the force generated in second chamber (1102B) of the main cylinder (1102), then the main cylinder piston rod (1112) and the plunger cylinder piston rod (1212) moves to an extended position (as shown in FIG. 1B). For example, the first chamber (1102A) of the main cylinder (1102) and the third chamber (1202A) of the plunger cylinder (1202) are configured to selectively receive hydraulic fluid from any one of the high pressure hydraulic line, the medium pressure hydraulic line and the low pressure hydraulic line through the main cylinder cap end side port (1106P) and the plunger cylinder cap end side port (1206P) respectively, and the hydraulic fluid exits from the second chamber (1102B) of the main cylinder (1102) to the corresponding pressure hydraulic line to which it is connected for facilitating extension of the main cylinder piston rod (1112) and the plunger cylinder piston rod (1212) based on load requirement of the actuator assembly (1000). Conversely, if the force generated in the second chamber (1102B) of the main cylinder (1102) surpasses the combined force in first chamber (1102A) of the main cylinder (1102) and the third chamber (1202A) of the plunger cylinder (1202), then the main cylinder piston rod (1112) along with the plunger cylinder piston rod (1212) moves to a retracted position (as shown in FIG. 1A). For example, the second chamber (1102B) of the main cylinder (1102) is configured to selectively receive hydraulic fluid from any one of the high pressure hydraulic line and the medium pressure hydraulic line through the main cylinder head end side port (1109P), and the hydraulic fluid exits from the first chamber (1102A) of the main cylinder (1102) and the third chamber (1202A) of the plunger cylinder (1202) to respective pressure hydraulic line to which it is connected for facilitating retraction of the main cylinder piston rod (1112) along with the plunger cylinder piston rod (1212) based on load requirement of the actuator assembly (1000). The stroke of the plunger cylinder assembly (1200) is slightly more than the stroke of the main cylinder assembly (1100) so that during the entire operation of the actuator assembly (1000), the plunger cylinder piston (1204) doesn't contact with plunger cylinder cap end cover (1206) and the plunger cylinder head end cover (1208).

The technical advantages of the actuator assembly (1000) are as follows. The actuator assembly (1000) is configured to reduce throttling loss at control valves thereby reducing an overall power consumption of the heavy construction machine.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modifications within the spirit and scope of the embodiments as described herein.

We claim:

1. An actuator assembly for a heavy construction machine, the actuator assembly comprising:

a main cylinder assembly having a main cylinder and a main cylinder piston slidably disposed within the main cylinder; and a plunger cylinder assembly disposed parallel to the main cylinder assembly, wherein the plunger cylinder assembly includes a plunger cylinder and a plunger cylinder piston slidably disposed within the plunger cylinder, wherein the main cylinder assembly is a double acting cylinder assembly in which the main cylinder defines a first chamber and a second chamber in which the main cylinder piston separates the first chamber from the second chamber;

the plunger cylinder assembly is a single acting cylinder assembly in which the plunger cylinder defines a third chamber therein, wherein the plunger cylinder assembly includes:

a plunger cylinder cap end cover connected to one end of the plunger cylinder;

a plunger cylinder head end cover removably connected to another end of the plunger cylinder; and a plunger cylinder piston rod, wherein one end of the plunger cylinder piston rod is connected to the plunger cylinder piston and another end of the plunger cylinder piston rod defines a ball-socket joint connected to a main cylinder rod eye of the main cylinder assembly; and each of the first, second and third chambers are selectively provided in fluid communication with one of a high pressure (HP) hydraulic line, a medium pressure (MP) hydraulic line and a low pressure hydraulic line (LP) based on load requirement of the actuator assembly.

2. The actuator assembly as claimed in claim 1, wherein the main cylinder assembly includes:

a main cylinder cap end cover connected to one end of the main cylinder;

a main cylinder head end cover connected to another end of the main cylinder through a flange; and a main cylinder piston rod, wherein one end of the main cylinder piston rod is connected to the main cylinder piston and another end of the main cylinder piston rod is connected to the main cylinder rod eye.

3. The actuator assembly as claimed in claim 1, wherein the actuator assembly includes:

a locating pin adapted to connect the plunger cylinder cap end cover with a main cylinder cap end cover thereby positioning or aligning the plunger cylinder assembly with respect to the main cylinder cap end cover;

at least one first locking element adapted to lock said plunger cylinder cap end cover to the main cylinder cap end cover thereby locking the plunger cylinder assembly with the main cylinder cap end cover, wherein the first locking element is at least a bolt; and a first retention member adapted to retain the first locking element against the main cylinder cap end cover, wherein the first retention member is at least a snap ring.

4. The actuator assembly as claimed in claim 1, wherein the actuator assembly includes:

a second retention member adapted to retain the ball-socket joint against a main cylinder rod eye; and a plurality of second locking elements adapted to lock the second retention member against the main cylinder rod eye, wherein each of the second locking element is at least a bolt.

5. The actuator assembly as claimed in claim 1, wherein the plunger cylinder assembly includes a linear position sensor adapted to detect a position/stroke of the actuator assembly, wherein the linear position sensor is configured to utilize magnetostriction to determine the position of the plunger cylinder piston rod and a main cylinder piston rod and sends velocity feedback to a controller unit which in turn estimates a required flow rate from pressure rails;

the plunger cylinder cap end cover defines a plunger cylinder cap end side port adapted to facilitate entry or exit of hydraulic fluid with respect to the third chamber of the plunger cylinder;

a main cylinder cap end cover defines a main cylinder cap end side port adapted to facilitate entry or exit of hydraulic fluid with the first chamber of the main cylinder; and the main cylinder assembly includes a hydraulic fluid delivery tube, wherein one end of the tube is connected to a main cylinder head end cover and another end of the tube defines a main cylinder head end side port adapted to facilitate entry or exit of hydraulic fluid with respect to the second chamber of the main cylinder.

6. The actuator assembly as claimed in claim 1, wherein the plunger cylinder assembly includes:

a plunger cylinder piston bearing adapted to be mounted onto the plunger cylinder piston, wherein a gap is defined between the plunger cylinder piston bearing and the plunger cylinder piston to allow hydraulic fluid flow from one side of the plunger cylinder piston to another side of the plunger cylinder piston, wherein the third chamber of the plunger cylinder includes area from both sides of the plunger cylinder piston; and a plunger cylinder bimetallic bush is adapted to be received by a bush receiving groove defined in plunger cylinder head end cover at is inner side, wherein the plunger cylinder piston bearing and the plunger cylinder bimetallic bush are adapted to improve side load carrying capacity of the plunger cylinder assembly; and the plunger cylinder bimetallic bush is adapted to guide the plunger cylinder piston rod during extension and retraction of the plunger cylinder piston rod.

7. The actuator assembly as claimed in claim 1, wherein the plunger cylinder assembly includes:

at least one first sealing element adapted to be received by a first seal receiving groove defined on the plunger cylinder head end cover at its outer side and is engaged with the plunger cylinder; and a plurality of second sealing elements, wherein each of the second sealing element is adapted to be received by a second seal receiving groove defined in the plunger cylinder head end cover at its inner side and is engaged with the plunger cylinder piston rod.

8. The actuator assembly as claimed in claim 1, wherein the first chamber of the main cylinder and the third chamber of the plunger cylinder are configured to selectively receive hydraulic fluid from any one of the high pressure hydraulic line, the medium pressure hydraulic line and the low pressure hydraulic line through a main cylinder cap end side port and a plunger cylinder cap end side port respectively, and the hydraulic fluid exits from the second chamber of the main cylinder to the corresponding pressure hydraulic line to which it is connected for facilitating extension of a main cylinder piston rod and the plunger cylinder piston rod based on load requirement of the actuator assembly; and the second chamber of the main cylinder is configured to selectively receive hydraulic fluid from any one of the high pressure hydraulic line and the medium pressure hydraulic line through the main cylinder head end side port and the hydraulic fluid exits from the first chamber of the main cylinder and the third chamber of the plunger cylinder to respective pressure hydraulic line to which it is connected for facilitating retraction of the main cylinder piston rod along with the plunger cylinder piston rod based on load requirement of the actuator assembly.

9. The actuator assembly as claimed in claim 8, wherein the main cylinder piston rod and the plunger cylinder piston rod moves to the extended position when the sum of the force generated in the first chamber of the main cylinder and the third chamber of the plunger cylinder exceeds the force generated in second chamber of the main cylinder;

the main cylinder piston rod along with the plunger cylinder piston rod moves to the retracted position when the force generated in the second chamber of the main cylinder surpasses the combined force in first chamber of the main cylinder and the third chamber of the plunger cylinder; and a stroke of the plunger cylinder assembly is more than a stroke of the main cylinder assembly so that during the entire operation of the actuator assembly, the plunger cylinder piston doesn't contact with plunger cylinder cap end cover and the plunger cylinder head end cover.

* * * * *